(12) United States Patent
Wada et al.

(10) Patent No.: US 7,157,182 B2
(45) Date of Patent: Jan. 2, 2007

(54) BATTERY

(75) Inventors: Seiji Wada, Katano (JP); Susumu Kato, Moriguchi (JP); Yasushi Sumihiro, Sakai (JP); Kenji Yamamoto, Katano (JP); Yuji Mototani, Yawata (JP); Ryohei Ashihara, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 116 days.

(21) Appl. No.: 10/480,236

(22) PCT Filed: Jun. 11, 2002

(86) PCT No.: PCT/JP02/05819

§ 371 (c)(1),
(2), (4) Date: Dec. 10, 2003

(87) PCT Pub. No.: WO02/103821

PCT Pub. Date: Dec. 27, 2002

(65) Prior Publication Data

US 2004/0209164 A1    Oct. 21, 2004

(30) Foreign Application Priority Data

Jun. 13, 2001  (JP) .............................. 2001-179195
Mar. 22, 2002  (JP) .............................. 2002-080792

(51) Int. Cl.
*H01M 2/30* (2006.01)
*H01M 2/08* (2006.01)

(52) U.S. Cl. ...................... 429/178; 429/180; 429/181; 429/1

(58) Field of Classification Search .................. 429/1, 429/178, 180, 181
See application file for complete search history.

(56) References Cited

U.S. PATENT DOCUMENTS 4,179,545 A * 12/1979 Ciliberti, Jr. .................. 429/65
4,508,797 A *  4/1985 Knoedler et al. ........... 429/184
4,775,604 A * 10/1988 Dougherty et al. ......... 429/178

FOREIGN PATENT DOCUMENTS

| JP | 45-16491 | 7/1970 |
| JP | 51-428 | 1/1976 |
| JP | 52-72029 | 5/1977 |
| JP | 54-48934 | 4/1979 |
| JP | 58-147163 | 10/1983 |
| JP | 58-169768 | 10/1983 |
| JP | 60-102875 | 7/1985 |
| JP | 9-106801 | 4/1997 |

* cited by examiner

*Primary Examiner*—John S. Maples
(74) *Attorney, Agent, or Firm*—McDermott Will & Emery LLP (57) ABSTRACT

In order to enable the safer use of an assembly of multiple cells comprising: a plurality of unit cells; an outer container for housing the unit cells; a terminal plate for sealing an upper opening of the outer container; and a positive output terminal and a negative output terminal formed on the same face of the terminal plate, at least the side face of the negative output terminal is covered by a protective tube having an electrical insulation property.

3 Claims, 7 Drawing Sheets

BATTERY

TECHNICAL FIELD

The present invention relates to an assembly of multiple cells comprising a terminal plate provided with positive and negative output terminals in close proximity to each other on the same face thereof.

BACKGROUND ART

Recently, as the form of a packaged battery, the trend is shifting from a shrink-packaged product obtained by wrapping a battery body with a heat-shrinkable film, toward a blister-packaged product obtained by forming a recess in a plastic sheet, housing a battery body in the recess and sealing the opening of the recess. In the case of the blister-packaged product, a battery that is not shrink-packaged is housed in a blister package.

Figure 11:
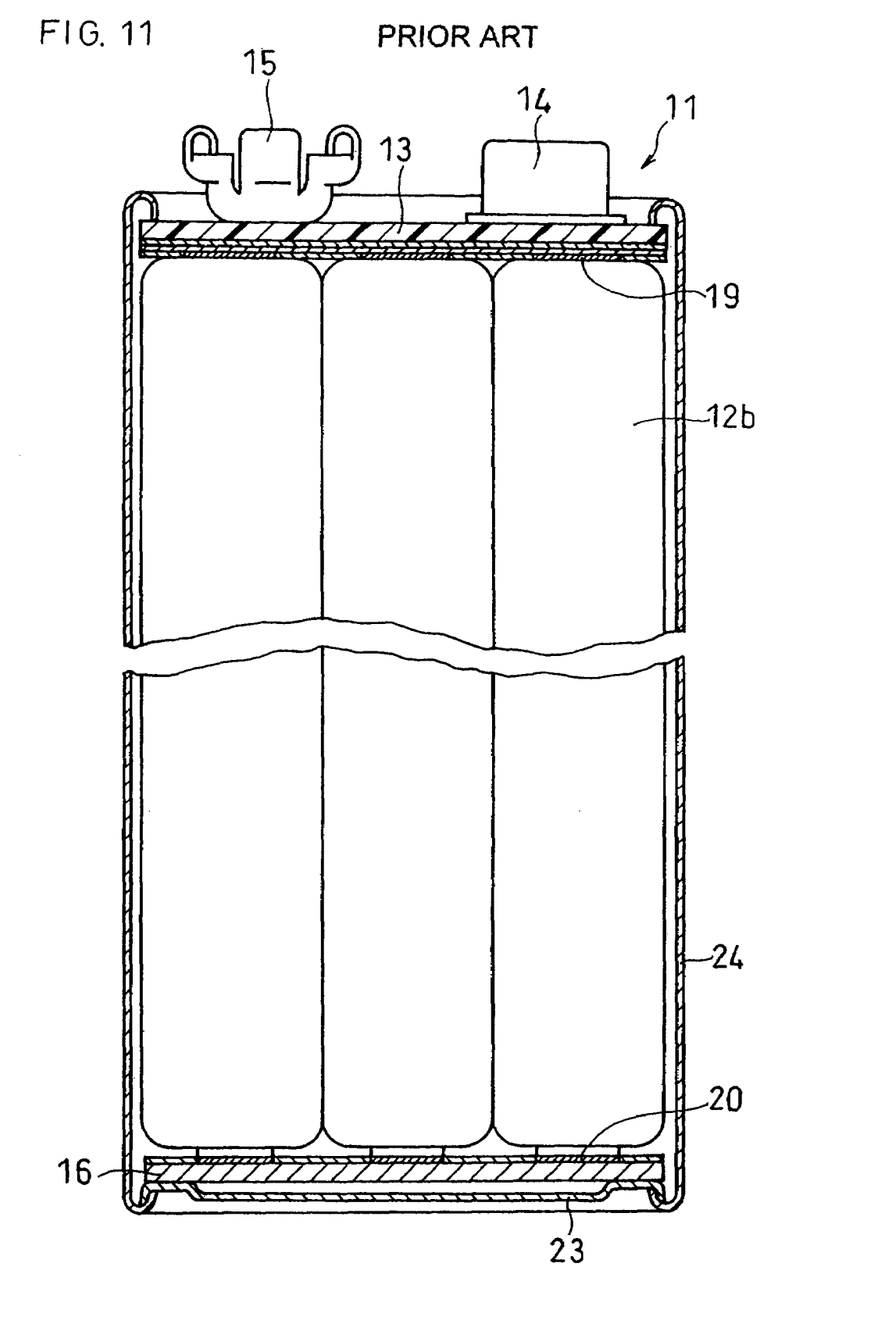
FIG. 11 is a schematic vertical sectional view showing the configuration of a conventional assembly of multiple cells.
Figure 12:
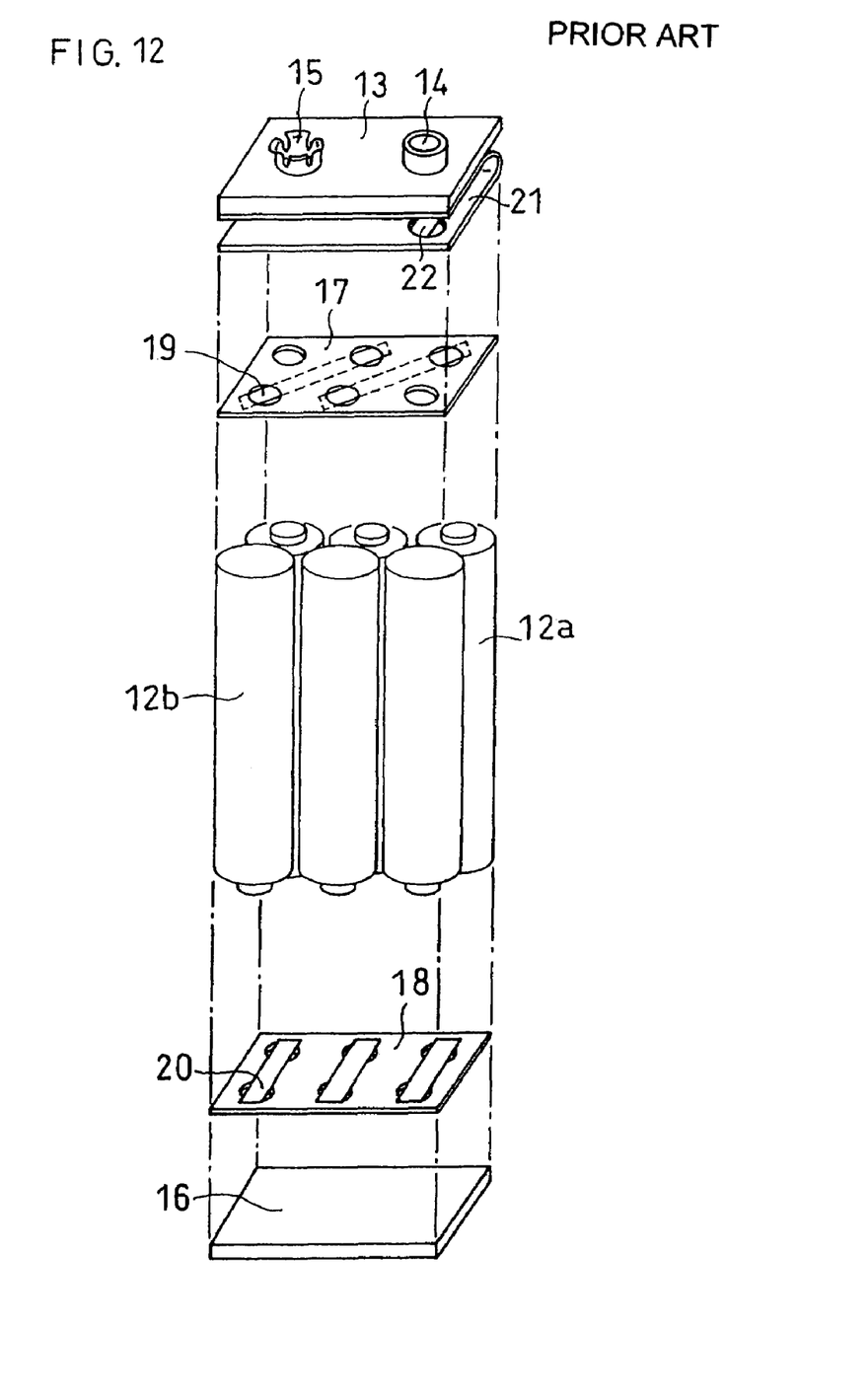
FIG. 12 is an exploded perspective view of a relevant part of the assembly of multiple cells shown in FIG. 11.

Herein, as an example of battery assemblies, a schematic vertical sectional view and an exploded oblique view of an alkaline dry battery 6LR61, are shown in FIG. 11 and FIG. 12, respectively.

A unit cell group constituting the alkaline dry battery 6LR61 is composed of a first unit cell row 12a (having a sealed portion facing upwardly) including three unit cells and a second unit cell row 12b (having a sealed portion facing downwardly) including three unit cells, in which these rows are connected in series.

Each unit cell is an alkaline dry battery in which the power generating elements are housed in a cylindrical steel battery case having a bottom face, and the opening of the battery case is sealed by a nylon gasket having a negative electrode current collector and a negative electrode terminal plate. The unit cell is covered by a heat-shrinkable resin tube, except for the upper and lower terminal sections thereof. The above-described unit cell group is housed in an outer jacket 24.

Disposed as an upper connecting plate at the upper portion of the unit cell group is an insulating paper 17, which has apertures respectively formed in the portions corresponding to the terminal section at the top of the unit cells, as well as having two lead pieces 19, attached on the lower side portion of these apertures, for connecting in series the unit cells of the first unit cell row 12a and the unit cells of the second unit cell row 12b. The two lead pieces 19 are spot-welded to the terminal section of the unit cells at the portions provided with the apertures of the insulating paper 17.

Disposed as a lower connecting plate at the lower portion of the unit cell group is an insulating paper 18, which has apertures respectively formed in the portions corresponding to the terminal section at the bottom of the unit cells, as well as having three lead pieces 20, attached on the upper side portion of these apertures, for connecting in series the unit cells of the first unit cell row 12a and the unit cells of the second unit cell row 12b. The three lead pieces 20 are spot-welded to the terminal section of the unit cells at the portions provided with the apertures of the insulating paper 18. A spacer 16 is disposed on the lower side of the insulating paper 18 which is the lower connecting plate.

On the lower side of the terminal plate 13 which is made of synthetic resin and provided with a positive output terminal 14 and a negative output terminal 15, an insulating paper 21, a positive electrode lead piece 22 and a negative electrode lead piece (not shown) are mounted with rivets. The output terminals are respectively connected to the lead pieces by means of rivets.

The end portion of the lead piece 22, which is connected to the positive output terminal 14 on the terminal plate 13, is connected to the positive electrode terminal (the right end in FIG. 12) of a unit cell in the second unit cell row 12b at around the apertures of the insulating paper 21. Further, the lead piece connected to the negative output terminal 15 is similarly connected to the negative electrode terminal (the left end in FIG. 12) of a unit cell in the first unit cell row 12a at around the apertures of the insulating paper 21. In this manner, six unit cells are connected in series, so that output power can be taken out from the positive output terminal 14 and the negative output terminal 15.

Figure 13:
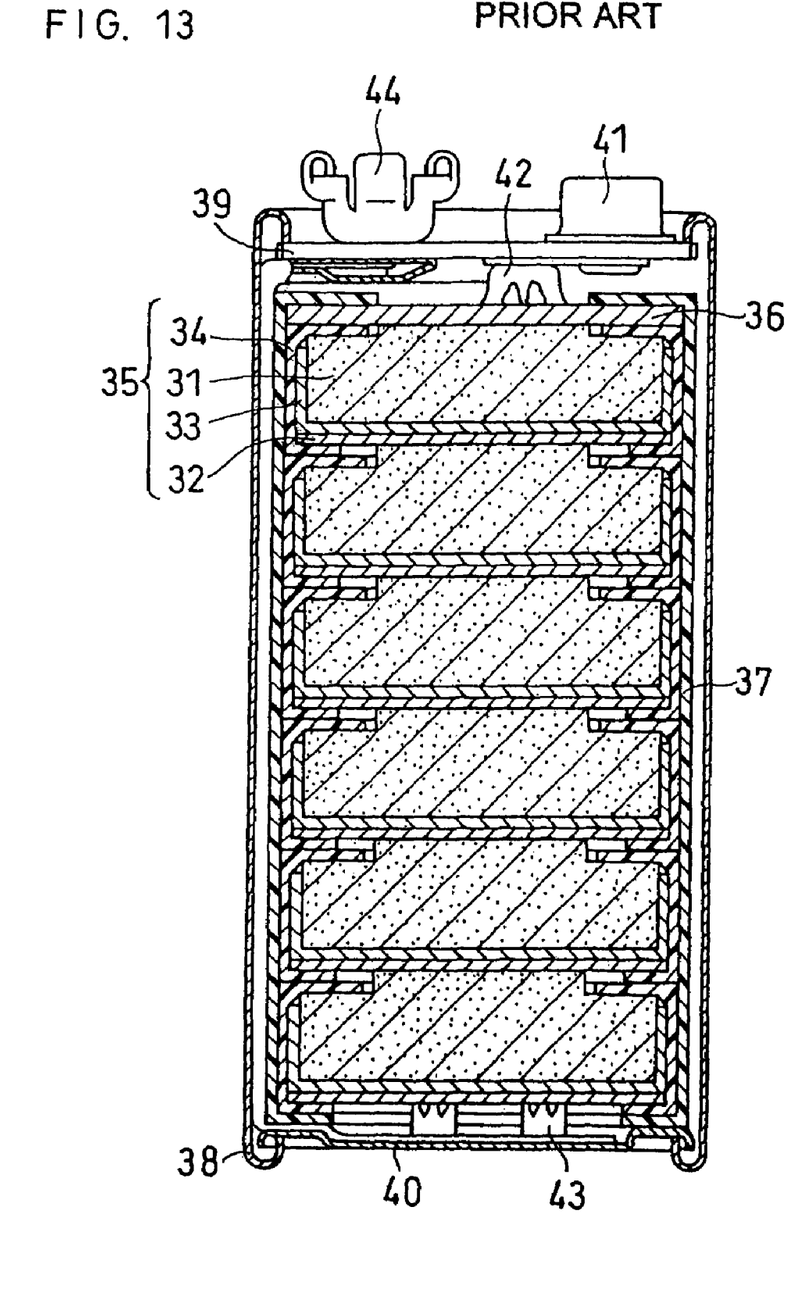
FIG. 13 is a schematic vertical sectional view showing the configuration of a conventional stacked dry battery.

Further, as an example of stacked dry batteries produced by stacking plural unit cells apart from the above example, a schematic vertical sectional view of a stacked dry battery 006P is shown in FIG. 13. A stacked body produced by stacking six unit cells 35, is housed in an outer jacket 38. Each unit cell 35 comprises, for example, a connecting electrode plate 32 composed of a zinc plate and a carbon coating provided on the undersurface of the zinc plate, a paper-made dish-like separator 33 with a pasting agent applied on the surface thereof facing the connecting electrode plate 32, a molded body of a positive electrode mixture 31 and a heat-shrinkable tube 34 for covering these components.

The stacked body is covered by wax and a heat-shrinkable tube 37. Then, the heat-shrinkable tube 37 is heat-shrunk such that the rim of the upper end and the rim of the lower end of the heat-shrinkable tube 37 closely adhere to the upper periphery and the lower periphery of the stacked body, respectively.

A positive output terminal 41 disposed on a terminal plate 39 is connected to a positive electrode lead plate 42, thereby connecting the positive electrode lead plate 42 to a positive electrode current collector plate 36. Further, a negative electrode lead plate 43 is connected to the connecting electrode plate of the unit cell located at the lowermost part of the stacked body and to a negative output terminal 44 disposed on a terminal plate 39.

An assembly of multiple cells of alkaline dry batteries 6LR61, manganese dry batteries 6F22 or the like, comprises a terminal plate provided with positive and negative output terminals in close proximity to each other on the same face thereof. In such an assembly of multiple cells, since the positive and negative output terminals are in close proximity to each other, when a battery is taken out from the blister package and put, for example, in a pocket, electrical conduction may occur between the terminals by a coin, a metal chain or the like in the pocket, thereby easily causing an external short circuit. For this reason, measures are being sought for, which is able to prevent the external short circuit between the output terminals, without shrink-wrapping individual battery assemblies.

Hitherto, various methods have been devised for preventing the external short circuit and further identifying the unused state, (so-called, virginity), of an assembly of multiple cells. For example, Japanese Unexamined Utility Model Publication No. Sho 52-72029 discloses a sealing member for a positive electrode terminal surface comprising an insulating ring made of a thermoplastic synthetic resin with an L-shaped cross section, and a bridging band-like portion formed integrally with the insulating ring. However, there is a problem that this sealing member not only has a complex structure thereby making the integral molding step itself complicated, but also is relatively difficult to install on the positive electrode terminal surface. Further, this sealing member is not applicable to the negative electrode terminal surface.

Additionally, Japanese Unexamined Utility Model Publication No. Sho 54-48934, discloses an old-or-new classification plate for dry batteries obtained by providing small pores on the periphery of the center of an insulating thin plate such as paper, and applying an adhesive on a portion thereof other than the center. Further, Japanese Laid-Open Patent Publication No. Sho 58-169768 discloses a sealing tape for dry batteries obtained by applying an adhesive on one surface of a band-like tape body to cause a band-like film to adhere along the central portion of the resulting adhesive surface, and providing slits to form the above film such that the sealing tape can be partially stripped off. However, in the above cases, it is necessary to use an adhesive having the so-called adhesiveness, and the above-described sealing tapes are applicable to both the positive electrode terminal surface and the negative electrode terminal surface; however, they have a problem of poor workability in adhesion.

Moreover, each of the sealing members as described above is applied to a cylindrical battery having a positive electrode terminal and a negative electrode terminal respectively on the upper and lower portions thereof, and cannot be directly applied to an assembly of multiple cells comprising a terminal plate provided with positive and negative output terminals in close proximity on the same surface thereof.

Therefore, it is an object of the present invention to provide an assembly of multiple cells having a protective tube composed of an insulating material covering an output terminal, which does not necessitate the use of an adhesive or the processing of the protective tube into a complex shape, is capable of electrically isolating the positive output terminal and the negative output terminal by the protective tube with ease and does not require the protective tube to be removed from the assembly of multiple cells at the time of use, while also allowing an easy removal of the protective tube.

DISCLOSURE OF INVENTION

The present invention relates to an assembly of multiple cells comprising: a plurality of unit cells; an outer container for housing the unit cells; a terminal plate for sealing an upper opening of the outer container; and a cylindrically-formed positive output terminal and a negative output terminal with the upper opening thereof opened outwardly to have a collar-shaped portion, which are provided on the same face of the terminal plate, characterized in that the negative output terminal comprises a protective tube having an electrical insulation property, which covers at least the cylindrical side face under that collar-shaped portion.

It is preferable that the protective tube extends to the upper end surface of the collar-shaped portion.

It is also preferable that the protective tube extends beyond the upper end surface of the collar-shaped portion, and is capable of expanding in the diametric direction of the negative output terminal when electrically connected to the negative output terminal.

It is also preferable that the protective tube has a single cut-away portion extending from the upper end to the lower end thereof.

The present invention also relates to an assembly of multiple cells comprising: a plurality of unit cells; an outer container for housing the unit cells; a terminal plate for sealing an upper opening of the outer container; and a cylindrically-formed positive output terminal and a negative output terminal formed on the same face of the terminal plate, characterized in that the side face of the negative output terminal is covered by a protective tube having an electrical insulation property, which extends beyond the uppermost end of the collar-shaped portion, and the protective tube is transformable to the position of the upper end surface of the terminal when electrically connected to a terminal of a device using the assembly of multiple cells.

It is preferable that the protective tube is constituted by an elastic insulating material.

It is also preferable that the protective tube is constitute by an elastic insulating material and a non-elastic insulating material.

BEST MODE FOR CARRYING OUT THE INVENTION

The present invention relates to an assembly of multiple cells comprising: a plurality of unit cells; an outer container for housing the unit cells; a terminal plate for sealing an upper opening of the outer container; a positive output terminal and a negative output terminal formed on the same face of the terminal plate; and a protective tube having an electrical insulation property, which covers at least the side face of the negative output terminal.

Embodiment 1

Figure 1:
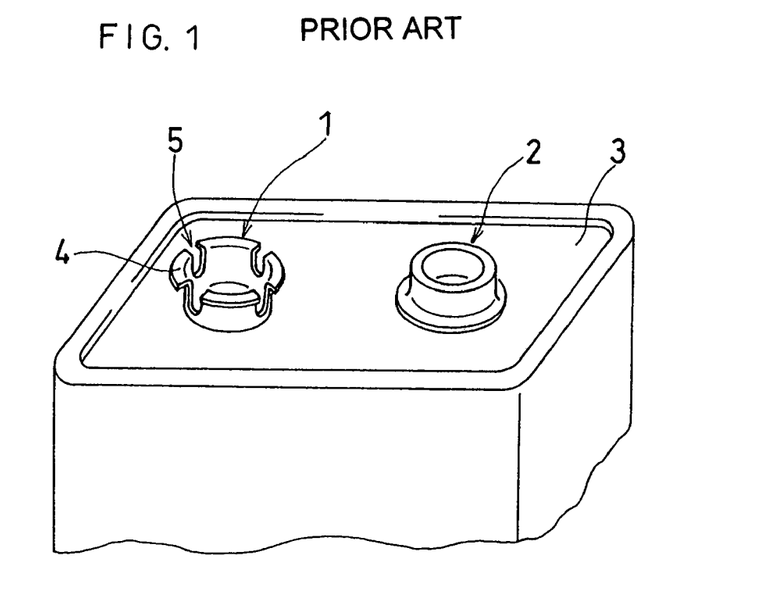
FIG. 1 is an oblique view showing the vicinity of a terminal plate of a conventional assembly of multiple cells.

FIG. 1 is an oblique view partially showing the vicinity of a terminal plate of a conventional assembly of multiple cells. As shown in FIG. 1, a cylindrical negative output terminal 1 and a positive output terminal 2 are disposed on a terminal plate 3. Particularly, in order to be connected to a terminal of the equipment employing the above assembly of multiple cells, the upper end of the negative output terminal 1 is opened outwardly to form a collar-shaped portion 4, with which slits 5 are also provided.

However, since no means is provided to electrically isolate the space between the negative output terminal 1 and the positive output terminal 2, there is a possibility that the terminals may be conducted, for example, by a coin or metal chain in a pocket thereby to cause an external short circuit, as described above.

Figure 2:
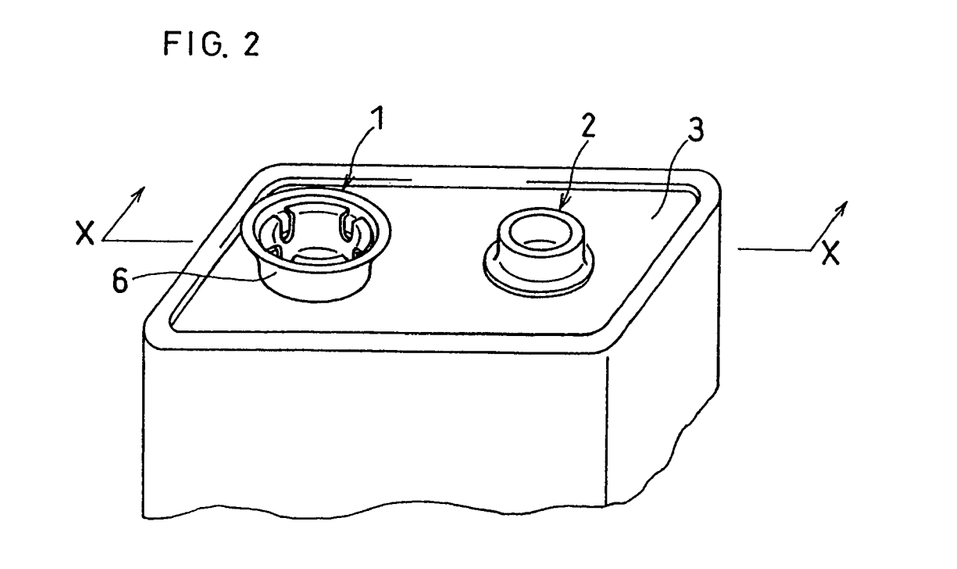
FIG. 2 is an oblique view showing the vicinity of a terminal plate of an assembly of multiple cells in accordance with the present invention in which a protective tube 6 is disposed around a negative output terminal 1.

In contrast, in an assembly of multiple cells in accordance with the present invention, as shown in FIG. 2, a cylindrical protective tube 6 made of an insulating body is installed around the negative output terminal 1, thereby allowing the electrical isolation between the terminals by a simple method, without necessitating the use of an adhesive or the processing of an insulating material into a complex shape. At this time, it is preferable that the protective tube 6 extends over the upper end surface of the negative output terminal 1, as shown in FIG. 2. Herein, FIG. 2 is an oblique view showing the vicinity of a terminal plate of an assembly of multiple cells in accordance with the present invention in which a protective tube 6 is disposed around a negative output terminal 1.

Figure 3:
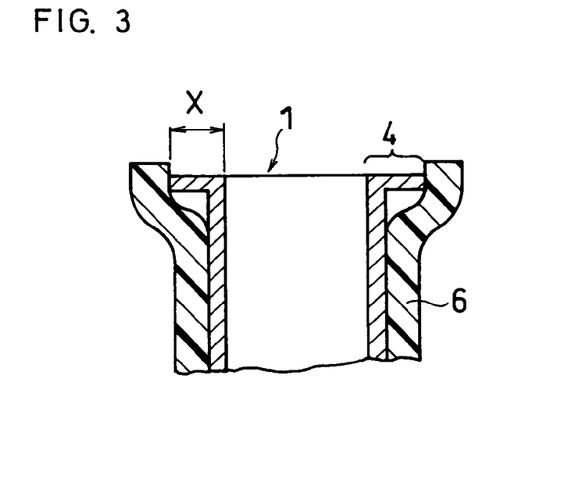
FIG. 3 is a partial sectional view of the negative output terminal 1 taken on line X—X in FIG. 2.

Next, FIG. 3 shows a partial sectional view of the negative output terminal 1 taken on line X—X in FIG. 2. As shown in FIG. 3, the side face of the negative output terminal 1 of the assembly of multiple cells in accordance with the present invention is covered by the protective tube 6, which extends over the top of the collar-shaped portion 4, that is, the upper end surface of the negative output terminal. In such a mode, it is possible to ensure the electrical isolation between the positive and negative output terminals, while preventing a short circuit caused by the upper end surface of the collar-shaped portion 4.

Figure 4:
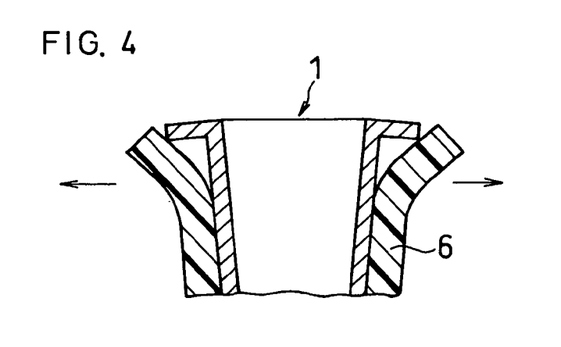
FIG. 4 is a partial sectional view of the protective tube 6 expanding in the diametric direction at the side face of the negative output terminal 1 in FIG. 3.

In this case, while it can also be assumed that the presence of the protective tube 6 makes it difficult to connect the positive output terminal to the negative output terminal 1, this presents no particular problem as long as the protective tube 6 is capable of shrinking in the axial direction. In addition, when the protective tube 6 is capable of expanding in the radial direction, the protective tube 6 expands in the radial direction and thus can be appropriately connected to the positive output terminal, as shown in FIG. 4.

Figure 5:
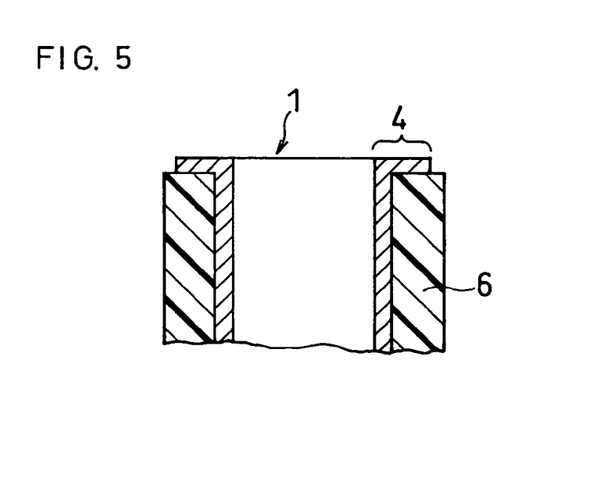
FIG. 5 is a partial sectional view of the protective tube 6 extending to the uppermost end of the negative output terminal 1 at the side face of the negative output terminal 1 in FIG. 3.

Further, in order to ensure the electrical isolation between the positive and negative output terminals, only the side face of the negative output terminal 1 may be covered by the protective tube 6 under the collar-shaped portion, as shown in FIG. 5.

Also in this case, the presence of the collar-shaped portion 4 provides an effect that the insulating body 6 is difficult to detach from the negative output terminal 1. Moreover, with the use of the assembly of multiple cells in accordance with the present invention, the protective tube 6 is disposed only on the side face of the negative output terminal 1, thereby providing an effect that it is not necessary to remove or install the protective tube 6 before and after the use of the battery. Certainly, it is also possible to remove the protective tube 6.

As is also clear from FIGS. 2 to 5, the protective tube 6 used in the present invention may be in any shape as long as it is capable of covering the side face of the negative output terminal 1. It is preferably an O-ring shape, C-ring shape or cylindrical shape, taking into account the shape of the negative output terminal and the manufacturing process. Herein, the C-ring refers to an O-ring or a tube, each having a C-shaped cross section. In other words, the protective tube may be formed with a single cut-away portion which extends from the upper end to the lower end thereof. In particular, the use of the protective tube having a C-ring shape cross section achieves the effect of enabling easy removal and installation of the protective tube.

It is preferable that the protective tube 6 is made of an elastic insulating material so that it can be easily installed even after manufacturing a conventional assembly of multiple cells. It is further preferable to employ an insulating material having thermal resistance and weatherability.

Herein, the negative output terminal 1 and positive output terminal 2 are each made of, for example, a nickel-plated steel plate. In particular, the steel plate composing the negative output terminal 1 preferably has a thickness of 0.25 to 0.3 mm. Additionally, in compliance with the industrial standard, the collar-shaped portion 4 (X in FIG. 3) of the negative output terminal 1 preferably has a size of around 0.75 mm and the protective tube 6 preferably has a thickness of 0.5 to 1.5 mm, more preferably around 1.00 mm.

Embodiment 2

Further, descriptions are made on the case where the present invention is applied to an assembly of multiple cells comprising a negative output terminal which has a shape different from that of Embodiment 1.

Figure 6:
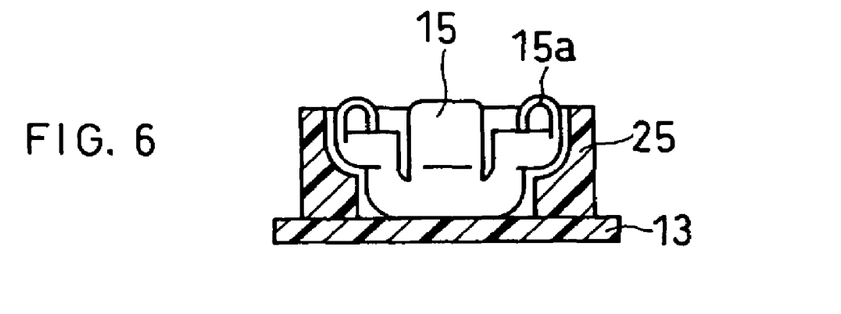
FIG. 6 is a schematic vertical sectional view showing the vicinity of a terminal plate of an assembly of multiple cells in which a protective tube having an electrical insulation property is disposed around a negative output terminal.

The assembly of multiple cells in accordance with the present invention comprises an outer container housing a plurality of unit cells and a terminal plate provided with positive and negative output terminals in close proximity to each other on the same face thereof, in which the side face of the negative output terminal 15 is covered by a protective tube 25 having an electrical insulation property, as shown in FIG. 6. This configuration is able to prevent an external short circuit occurring between the positive and negative output terminals.

In order to ensure the electrical isolation between the output terminals, it is preferable that the protective tube not only covers the side face of the negative output terminal, but also further extends beyond the upper end surface of the negative output terminal. In this case, however, it may be considered that the necessity will arise to remove or install the protective tube before and after the use of the battery.

Therefore, the protective tube having an electrical insulation property and covering the side face of the negative output terminal is extended beyond the upper end of the negative output terminal to ensure the electrical isolation between the output terminals, while forming the protective tube with an elastic body at least in the portion thereof in the axial direction, thereby enabling the use of the assembly of multiple cells with the protective tube installed thereon.

Figure 7:
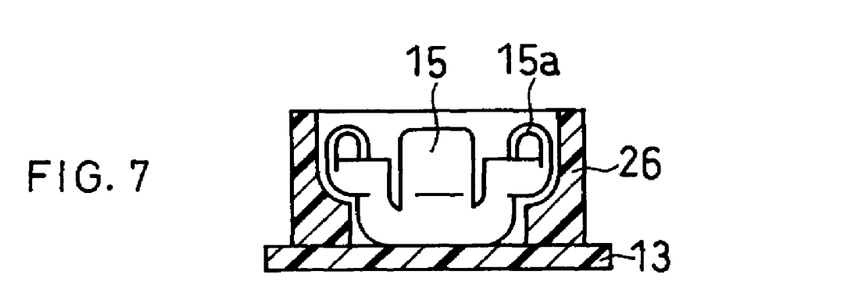
FIG. 7 is a schematic vertical sectional view showing the vicinity of a terminal plate of an assembly of multiple cells in accordance with the present invention in which a protective tube made of an elastic insulating material is disposed around a negative output terminal.

FIG. 7 shows a schematic vertical sectional view showing the vicinity of the terminal plate of the assembly of multiple cells in the above case. A protective tube 26 having an electrical insulation property disposed around the negative output terminal 15 on the terminal plate 13, is composed entirely of an elastic insulating material and extends beyond the upper end of the negative output terminal 15.

In this manner, the protective tube 26 having an electrical insulation property not only covers the side face of the negative output terminal 15, but also further extends beyond the upper end thereof, thereby ensuring the electrical isolation between the positive and negative output terminals.

Further, since the protective tube 26 having an electrical insulation property is composed entirely of an elastic insulating material, at the time of using the battery, the protective tube 26 can be compressed to shrink in the axial direction, exposing the negative output terminal 15. This enables the use of the assembly of multiple cells with the protective tube 26 installed thereon, so that it is not necessary to remove or install the protective tube 26 before and after the use of the assembly of multiple cells.

Figure 8:
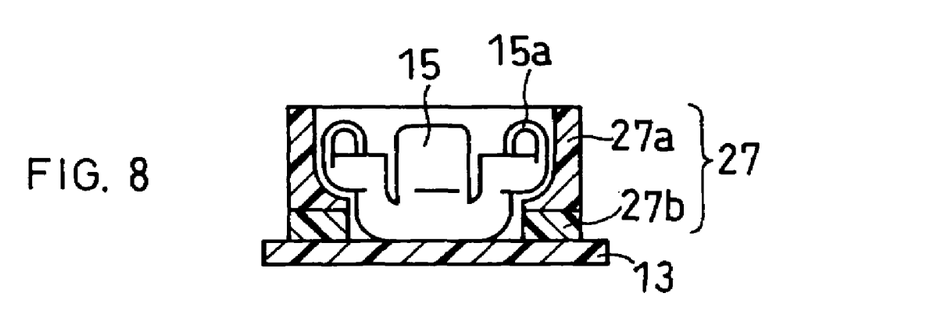
FIG. 8 is a schematic vertical sectional view showing the vicinity of a terminal plate of an assembly of multiple cells in accordance with the present invention in which a protective tube made of an elastic insulating material in the portion thereof in the axial direction, is disposed around a negative output terminal.

Further, FIG. 8 shows a schematic vertical sectional view showing the vicinity of the terminal plate of an assembly of multiple cells comprising a different protective tube. A protective tube 27 having an electrical insulation property disposed around the negative output terminal 15 on the terminal plate 13, comprises a part 27b composed of an elastic insulating material on the terminal plate 13 and a part 27a composed of a non-elastic insulating material disposed on the upper portion of the part 27b. The two parts of a different kind, the parts 27a and 27b, are joined, for example, by an adhesive, a hot-melt adhesive or a double-faced adhesive tape to be integrated to be a protective tube 27. Additionally, the part 27a composed of a non-elastic insulating material, which constitutes the upper portion of the protective tube 27, extends beyond the upper end of the negative output terminal 15.

In this manner, the protective tube 27 having an electrical insulation property not only covers the side face of the negative output terminal 15, but also further extends beyond the upper end thereof, thereby ensuring the electrical isolation between the positive and negative output terminals.

Moreover, since the lower portion of the protective tube 27 having an electrical insulation property is the part 27b composed of an elastic insulating material, at the time of using the battery, the part 27b composed of an elastic insulating material in the protective tube 27 can be compressed to shrink in the axial direction, exposing the negative output terminal 15. This enables the use of the assembly of multiple cells with the protective tube 27 installed thereon, so that it is not necessary to remove or install the protective tube 27 before and after the use of the assembly of multiple cells.

Figure 9:
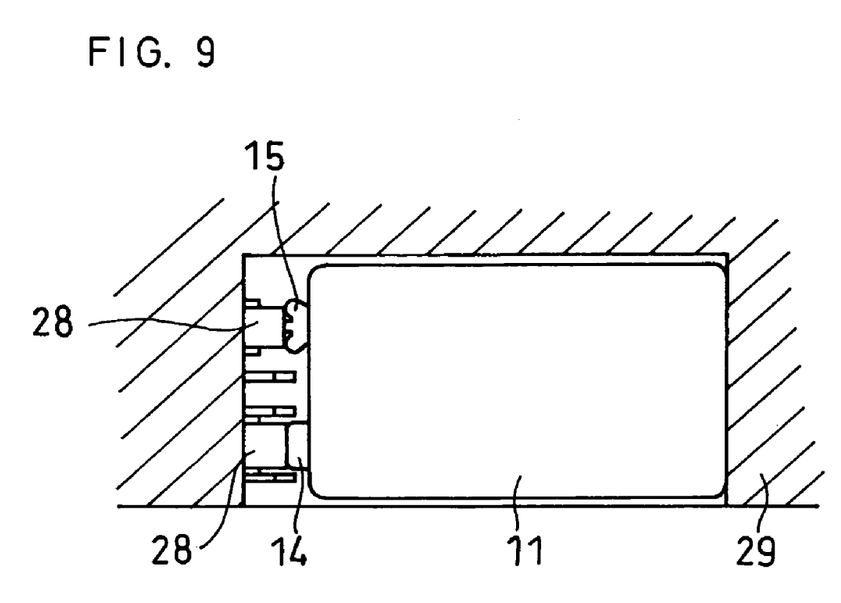
FIG. 9 is a schematic top plan view showing an example of an assembly of multiple cells in use.
Figure 10:
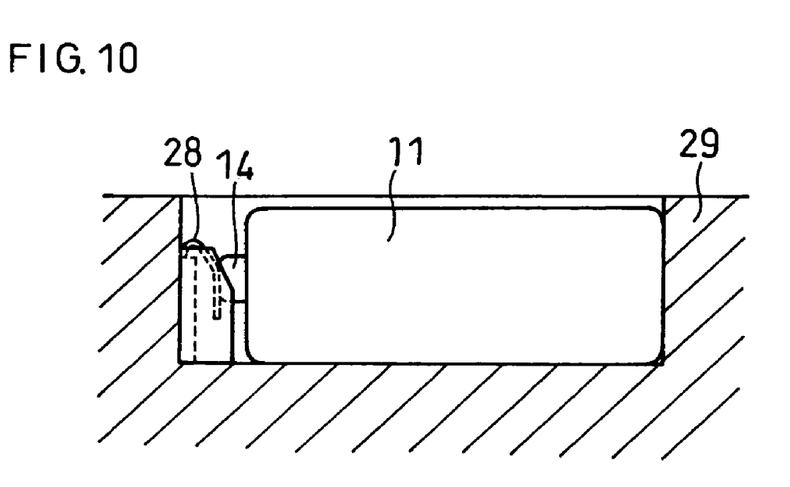
FIG. 10 is a schematic front view showing an example of an assembly of multiple cells in use.

Herein, an assembly of multiple cells in use is shown in FIG. 9 and FIG. 10. In the case of using the assembly of multiple cells of the present invention, when the upper ends of the positive output terminal 14 and negative output terminal 15 in an assembly of multiple cells 11 are brought into contact with input terminals 28 of equipment 29, the protective tube having an electrical insulation property (not shown) is interposed between the input terminal 28 and the terminal plate (not shown) of the assembly of multiple cells. At this time, the protective tube is compressed to shrink in the axial direction, so that the protective tube has the same height as the negative output terminal, covering only the side face of the negative output terminal. Accordingly, it becomes possible to bring the upper end of the output terminal into contact with the input terminal.

The protective tube 27 shown in FIG. 8 may employ a part composed of an elastic insulating material as the part 17a, and a part composed of a non-elastic insulating material as the part 17b.

As shown in FIG. 7, when the protective tube 26 is entirely elastic, the protective tube 26 can readily be installed on the negative output terminal 15 even after manufacturing a conventional assembly of multiple cells.

Since the negative output terminal 15 has the collar-shaped portion 15a formed by bending the end portion thereof inwardly, the protective tubes 26 and 27 are difficult to detach from the negative output terminal 15.

While various materials may be mentioned as the elastic insulating material forming the protective tubes, the typical examples include: rubbers such as natural rubber, chloroprene rubber, nitrile rubber, ethylenepropylene rubber, isoprene rubber, neoprene rubber, styrene rubber, butadiene rubber and styrene-butadiene rubber; an elastomer; polypropylene; and urethane resin.

In addition, the typical examples of the non-elastic insulating material forming the protective tubes include resins such as polyethylene, polypropylene, poly(vinyl chloride), ABS, polycarbonate, acrylic resin, polyamide, polybutylene terephthalate, polyethylene terephthalate, polyacetal, polytetrafluoroethylene, phenylene oxide and polysulfone.

It should be noted that since there is an established industrial standard for the size of the terminal of an assembly of multiple cells itself, a person skilled in the art will be able to appropriately control the size of the protective tubes in compliance with such standard, according to the properties of the materials employed.

INDUSTRIAL APPLICABILITY

As described above, according to the present invention, it is possible to provide an assembly of multiple cells having a protective tube composed of an insulating material covering output terminals, which does not necessitate the use of an adhesive or the processing of the protective tube into a complex shape, is capable of isolating the positive output terminal and the negative output terminal by the protective tube with ease and does not require the protective tube to be removed from the assembly of multiple cells at the time of use, while also allowing an easy removal of the protective tube.

The invention claimed is:

1. A battery, comprising: a container housing at least one unit cell therein, said container having an opening at one end thereof;
    a terminal plate sealing said opening and including an exposed surface;
    spaced-apart positive and negative output terminals provided on said exposed surface of said terminal plate, at least said negative output terminal being cylindrically shaped, wherein:
    said negative output terminal comprises an electrically insulative protective tube or sleeve covering at least the outwardly facing cylindrical side surface of said negative output terminal, said tube or sleeve comprising a first, lower portion constituted by an elastic insulating material and a second, upper portion constituted by a non-elastic insulating material wherein said negative output terminal, having an upper opening, extends outwardly to form a collar-shaped portion, and said protective tube of sleeve covers said side surface at least below said collar-shaped portion.

2. The battery as in claim 1, wherein:
said protective tube or sleeve extends to an upper end surface of said collar-shaped portion.
3. The battery as in claim 1, wherein:
said protective tube or sleeve extends beyond an upper end surface of said collar-shaped portion and said second, upper portion thereof is capable of expansion in a radial direction and compression in an axial direction when electrical connection is made to said negative output terminal.

\* \* \* \* \*

UNITED STATES PATENT AND TRADEMARK OFFICE
CERTIFICATE OF CORRECTION

PATENT NO. : 7,157,182 B2 Page 1 of 1
APPLICATION NO. : 10/480236
DATED : January 2, 2007
INVENTOR(S) : Seiji Wada et al.

It is certified that error appears in the above-identified patent and that said Letters Patent is hereby corrected as shown below:

On the title page of the Letters Patent,

Under section "(75) Inventors:", change:

" Seiji WADA, Katano (JP) " to -- Seiji WADA, Osaka (JP) --
" Susumu KATO, Monguchi (JP) " to -- Susumu KATO, Osaka (JP) --
" Yasushi SUMIHIRO, Sakai (JP) " to -- Yasushi SUMIHIRO, Osaka (JP) --
" Kenji YAMAMOTO, Katano (JP) " to -- Kenji YAMAMOTO, Osaka (JP) --
" Yuji MOTOTANI, Yawana (JP) " to -- Yuji MOTOTANI, Kyoto (JP) --
" Ryohei ASHIHARA, Neyagawa (JP) " to -- Ryohei ASHIHARA, Osaka (JP) --

Signed and Sealed this

Third Day of July, 2007

JON W. DUDAS
*Director of the United States Patent and Trademark Office*